United States Patent [19]

Haraguchi et al.

[11] Patent Number: 5,550,605
[45] Date of Patent: Aug. 27, 1996

[54] OPTICAL ELEMENT ROTATING DEVICE FOR LIQUID-CRYSTAL

[75] Inventors: Yoshio Haraguchi, Kanagawa; Minoru Okuda, Tokyo, both of Japan

[73] Assignee: Sony Corporation, Tokyo, Japan

[21] Appl. No.: 282,789

[22] Filed: Jul. 29, 1994

[30] Foreign Application Priority Data

Aug. 2, 1993 [JP] Japan .................................. 5-208147

[51] Int. Cl.⁶ .................................................. G02B 26/00
[52] U.S. Cl. .............................. 353/81; 359/198; 359/211
[58] Field of Search ............................ 353/81; 359/198, 359/200, 211, 831, 837; 348/756

[56] References Cited

U.S. PATENT DOCUMENTS

| | | | |
|---|---|---|---|
| 3,981,574 | 9/1976 | Jesensky et al. | 353/81 |
| 4,080,056 | 3/1978 | Jesensky et al. | 353/81 |
| 5,184,245 | 2/1993 | Murakami et al. | 359/211 |

*Primary Examiner*—William C. Dowling
*Attorney, Agent, or Firm*—Ronald P. Kananen

[57] ABSTRACT

A liquid-crystal projector with a light source, a projection lens set, and a liquid-crystal panel arranged between the light source and the projection lens set for displaying a video signal included in an odd field and a video signal included in an even field alternately at a predetermined period of time by the same pixels thereof in synchronization with a vertical synchronizing signal in the video signal. The liquid-crystal projector includes a wedge-shaped prism rotating device arranged between the projection lens set and a screen. The wedge-shaped prism rotating device includes an electromagnetic solenoid for converting a reciprocating motion of a solenoid plunger to a periodic rotational motion of a wedge-shaped prism about its optic axis clockwise and counterclockwise. The liquid-crystal projector also includes a control unit associated with the prism rotating device, for producing the periodic rotational motion in synchronization with the vertical synchronizing signal, so that both projected positions of picture images on the screen, each image included in either one of the odd and even fields, are offset to each other by one-pixel.

17 Claims, 16 Drawing Sheets

OPTICAL ELEMENT ROTATING DEVICE FOR LIQUID-CRYSTAL

BACKGROUND OF THE INVENTION

1. Field of the Invention

The present invention relates to an optical element rotating device suitable for a liquid-crystal projector system with a liquid-crystal panel which device can rotate the optical element about its optic axis, and specifically to an electromagnetic solenoid which can reciprocatingly rotate an optical element at a predetermined cycle.

2. Description of the Prior Art

As is well known, a liquid-crystal projector system employs a liquid-crystal panel, a light source, a projection lens set consisting of a group of projection lenses and a movable focus-adjustment lens, and a control circuit arranged for adjusting the focus of the focus adjusting lens. In recent years, the video technologies teach an improved liquid-crystal projector which is capable of alternately displaying a video signal included in an odd field and a video signal included in an even field, at a predetermined period of time by way of the same pixels of the liquid-crystal panel, and vertically offsetting both projected positions of the picture images of the respective fields to each other by one pixel in synchronization with a vertical synchronizing signal in the video signal, so as to distinctly display the projected images. In the conventional liquid-crystal projectors, it is desired to provide a more precise and superior vertical offsetting technologies for both projected positions of picture images, respectively included in an odd field and an even field, on a screen.

SUMMARY OF THE INVENTION

Accordingly, it is an object of the present invention to provide an improved optical-element rotating device suitably applied in use for a liquid-crystal projector system with a liquid-crystal panel, which device can precisely and timely offset both projected positions of picture images on a screen, respectively included in an odd field and an even field, by one pixel in synchronization with a vertical synchronizing signal in the video signal.

It is another object of the invention to provide an electromagnetic solenoid suitable for an optical element rotating device, which solenoid can rotate the optical element about its optic axis precisely and periodically in time clockwise and counterclockwise.

It is a further object of the invention to provide an improved liquid-crystal projector system with a wedge-shaped prism and a liquid-crystal panel which panel alternately displays video signals, respectively included in an odd field and an even field, at a predetermined period of time by the same pixels thereof, in which the projector system can precisely obtain one-pixel offset between both projected positions of picture images on a screen, each image included in either one of the odd and even fields, by rotating the wedge-shaped prism about its optic axis periodically in time clockwise and counterclockwise between two different phase angles, in synchronization with a vertical synchronizing signal in the video signal.

In order to accomplish the aforementioned and other objects of the invention, an optical element rotating device suitable for a liquid-crystal projector system, comprises a wedge-shaped prism functioning as the optical element, and an optical element mount rotatably supporting the wedge-shaped prism such that the prism rotates about its optic axis. In case that the wedge-shaped prism is assembled on the optical element support, the prism has a maximum thickness at the leftmost end and a minimum thickness at the rightmost end at its neutral angular position. A drive mechanism is assembled on an optical element chassis onto which the optical element mount is fixed, for rotating the prism about the optic axis periodically in time clockwise and anti-clockwise between two different phase angles of the prism with respect to the mount, in order to obtain one-pixel offset between both projected positions of picture images passing through the prism periodically in time.

According to another aspect of the invention, an electromagnetic solenoid for an optical element rotating device comprises a plunger made of a magnetic material and having a large-diameter section at its center portion and two small-diameter sections at both ends, a pair of coil bobbins each winding thereon an exciting coil and having a guide hole which hole slidably receives therein the corresponding small-diameter section of the plunger, and a solenoid casing serving as a support for the coil bobbins. The opposing inside end faces of the bobbins act to restrict an axial movement of the plunger in the two opposing axial directions by way of abutment between the inside end of each bobbin and the corresponding side wall of the large-diameter section of the plunger. The large-diameter section of the plunger is formed with a joint for mechanically linking a driven member such as an optical element to the plunger, so as to convert a rectilinear reciprocating motion of the plunger to a rotary motion of the driven member about a central axis of the driven member so that the driven member rotates about the central axis periodically in time clockwise and counterclockwise between given two different phase angles.

According to a further aspect of the invention, an electromagnetic solenoid for an optical element rotating device comprises a plunger made of a magnetic material and having a pair of plunger support shafts at both ends, a coil bobbin winding thereon an exciting coil and having a guide hole slidably receiving therein a portion of the plunger, a stopper fitted into a portion of the guide hole and slidably supporting one of the plunger support shafts and restricting the maximum possible inward axial movement of the plunger into the innermost end of the guide hole by way of abutment between the inside end of the stopper and the inside stepped portion of the plunger, a solenoid casing accommodating therein the coil bobbin and slidably supporting the other plunger support shaft, and a biasing means permanently biasing the plunger towards the exterior of the guide hole. A plunger-stroke adjusting nut is threadably received on a screw-threaded portion formed on the one plunger support shaft and fitting onto the outside end of the stopper. The adjusting nut is provided to adjust the maximum permissible stroke of the plunger by way of adjustment of a clearance defined between the inside end face of the stopper and the inside stepped portion of the plunger which stepped portion is abuttable with the inside end face of the stopper. The plunger is formed with a joint for mechanically linking a driven member such as an optical element to the plunger, so as to convert a rectilinear reciprocating motion of the plunger to a rotary motion of the driven member about a central axis of the driven member so that the driven member rotates about the central axis periodically in time clockwise and counterclockwise between given two different phase angles.

According to a still further aspect of the invention, a liquid-crystal projector system with a light source, a projection lens set consisting of a group of projection lenses and a movable focus-adjustment lens, a liquid-crystal panel which panel displays a video signal included in an odd field and a video signal included in an even field alternately at a predetermined period of time by the same pixels thereof, and an optical element for instance a wedge-shaped prism arranged on an optical path frontward of the liquid-crystal panel. The liquid-crystal projector system also includes an optical element drive mechanism and a control unit which unit consists of a wedge-shaped prism control circuit and a projection lens control circuit. The optical element drive mechanism is responsive to a control signal from said control unit, for providing one-pixel offset between both projected positions of picture images on a screen, each image included in either one of the odd and even fields, by rotating the optical element about its optic axis periodically in time clockwise and counterclockwise between predetermined two different phase angles, in synchronization with a vertical synchronizing signal in the video signal.

DESCRIPTION OF THE PREFERRED EMBODIMENTS

First embodiment

Figure 1:
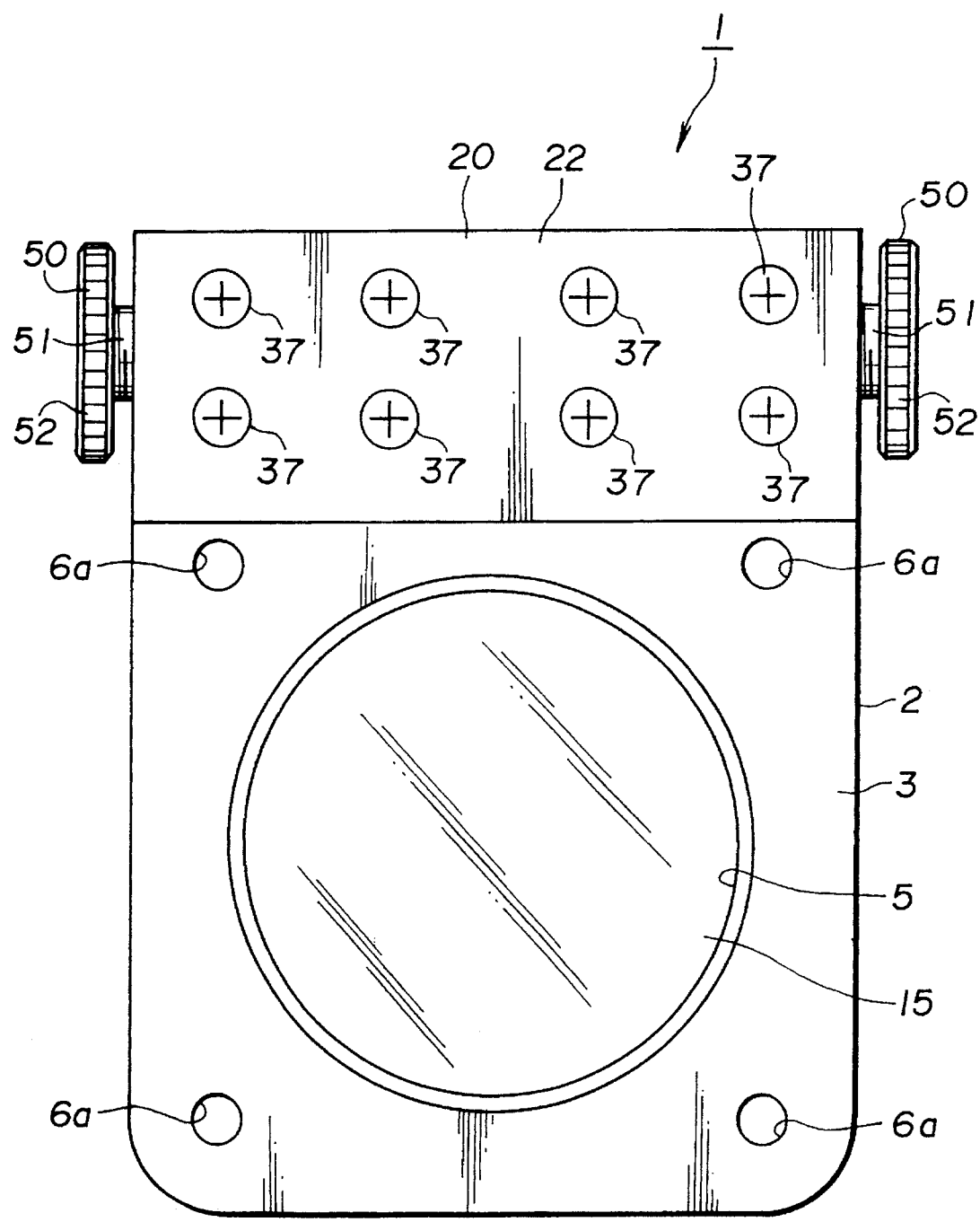
FIG. 1 is a front elevational view illustrating a first embodiment of an optical element rotating device according to the invention.
Figure 2:
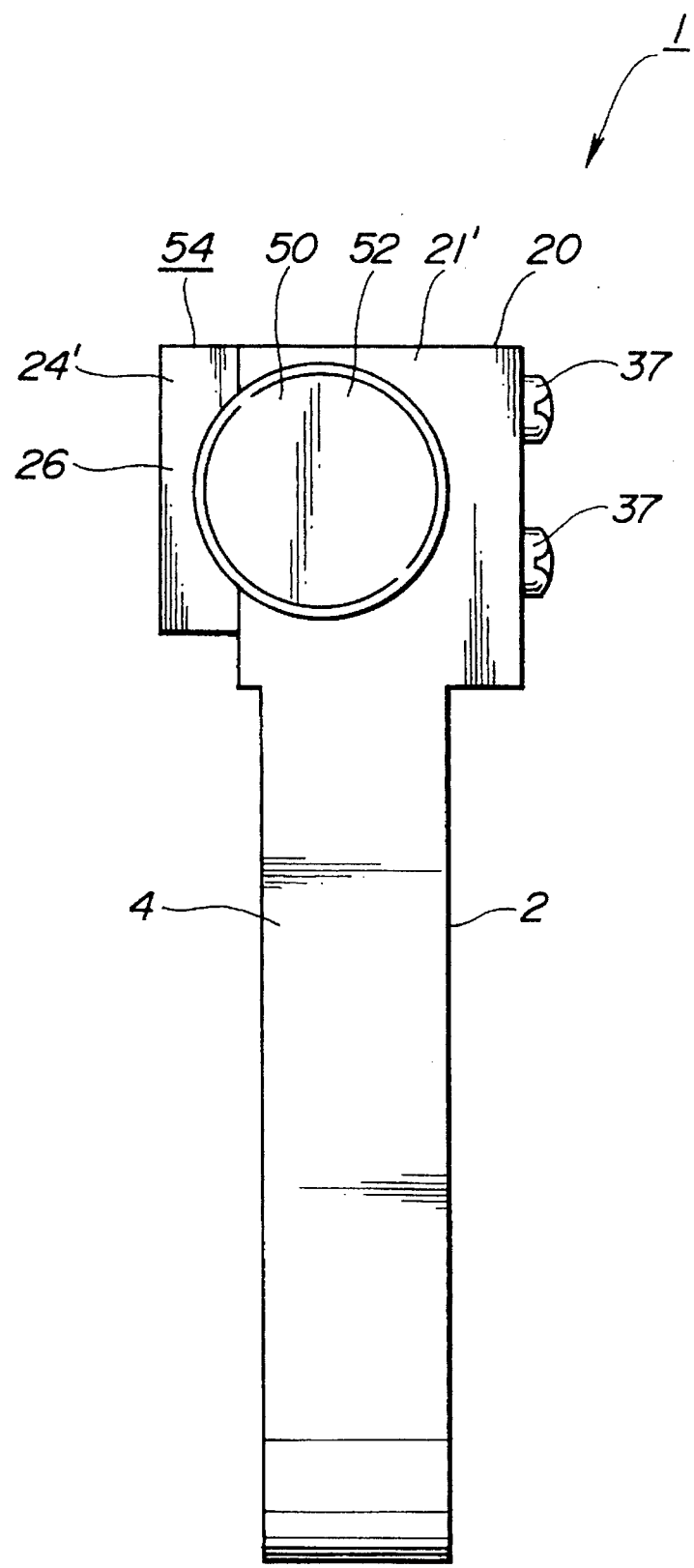
FIG. 2 is a side elevational view of the optical element rotating device of the first embodiment.
Figure 3:
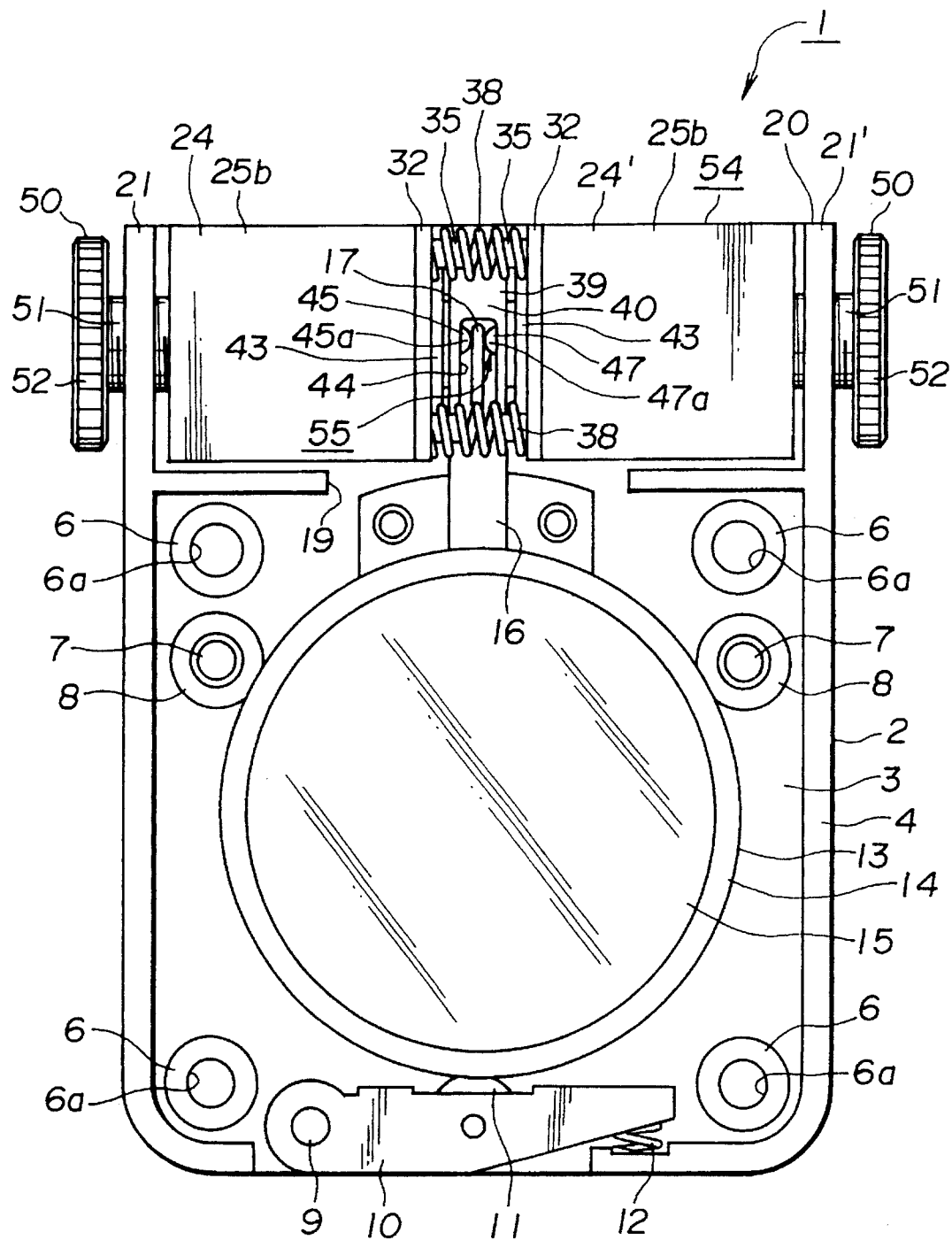
FIG. 3 is a back elevational view of the optical element rotating device of the first embodiment.
Figure 4:
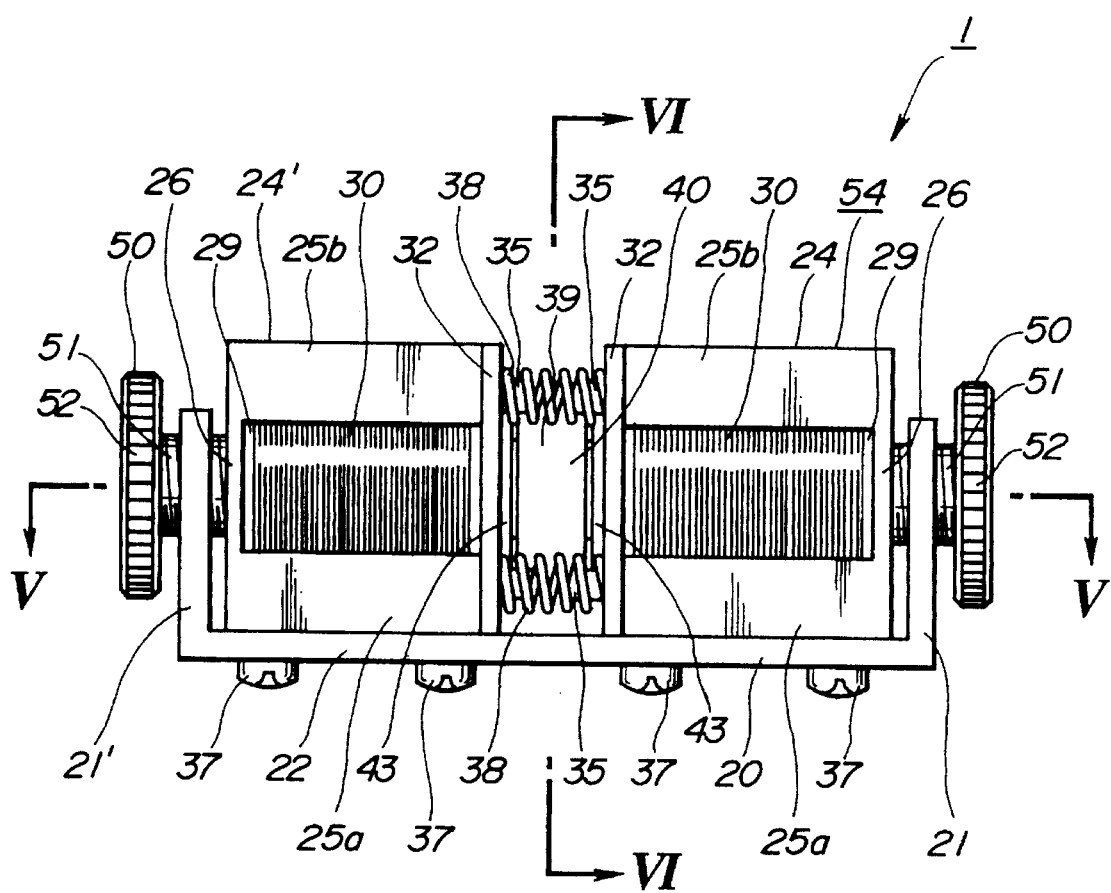
FIG. 4 is a top view of the optical element rotating device of the first embodiment.
Figure 5:
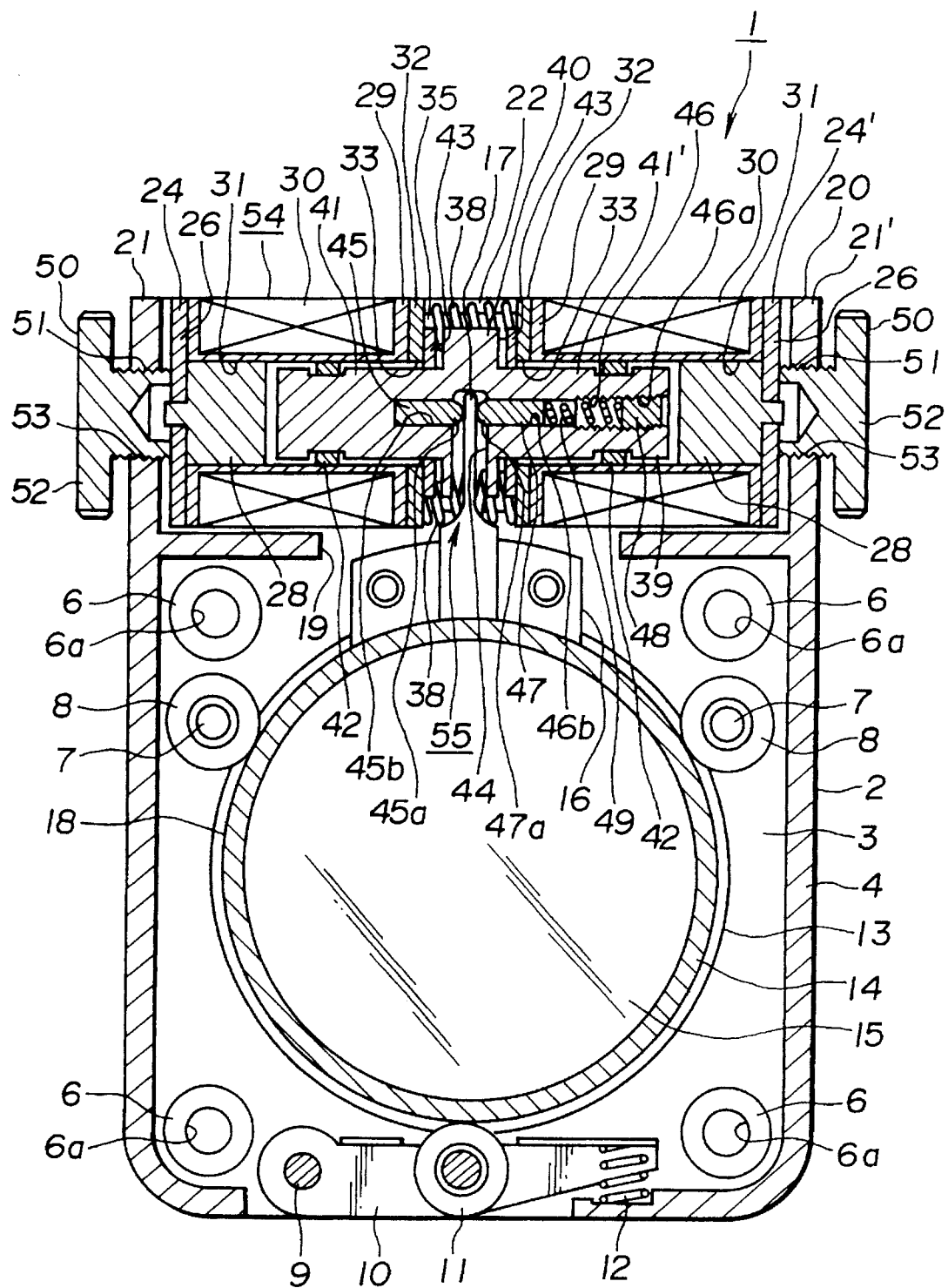
FIG. 5 is a cross-sectional view taken along the line V—V in FIG. 4.
Figure 6:
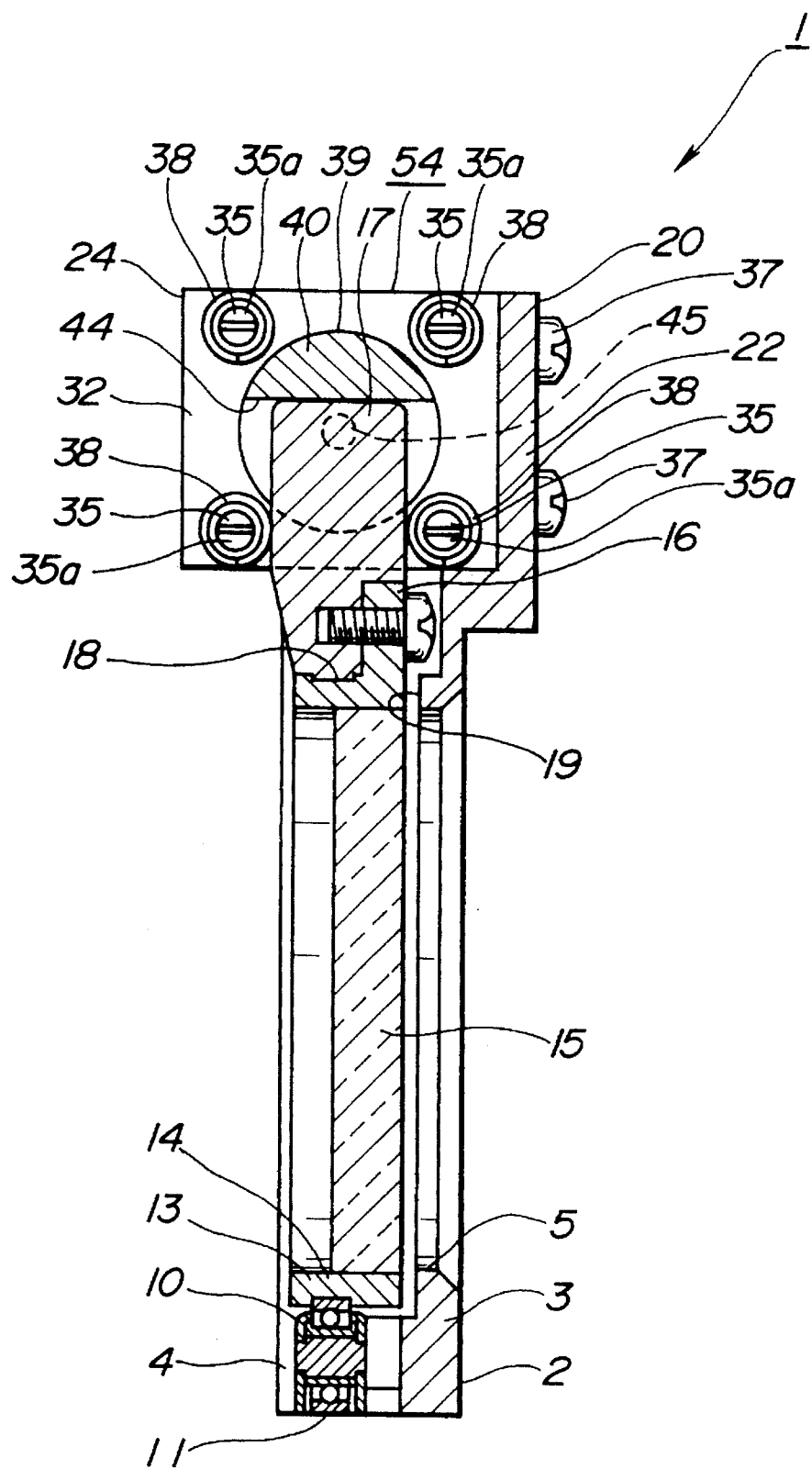
FIG. 6 is a cross-sectional view taken along the line VI—VI in FIG. 4.
Figure 7:
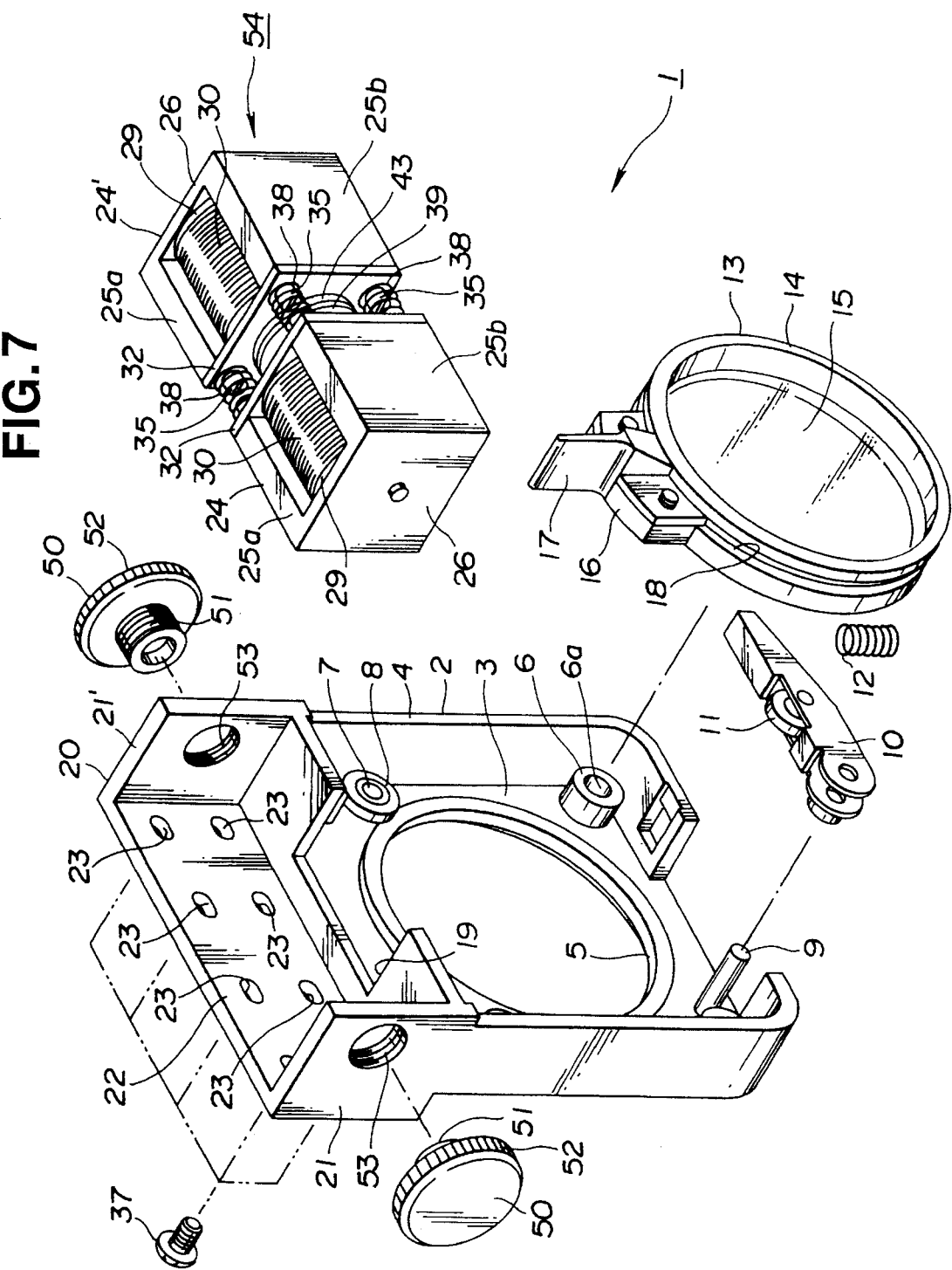
FIG. 7 is an exploded perspective view illustrating the optical element rotating device of the first embodiment.
Figure 8:
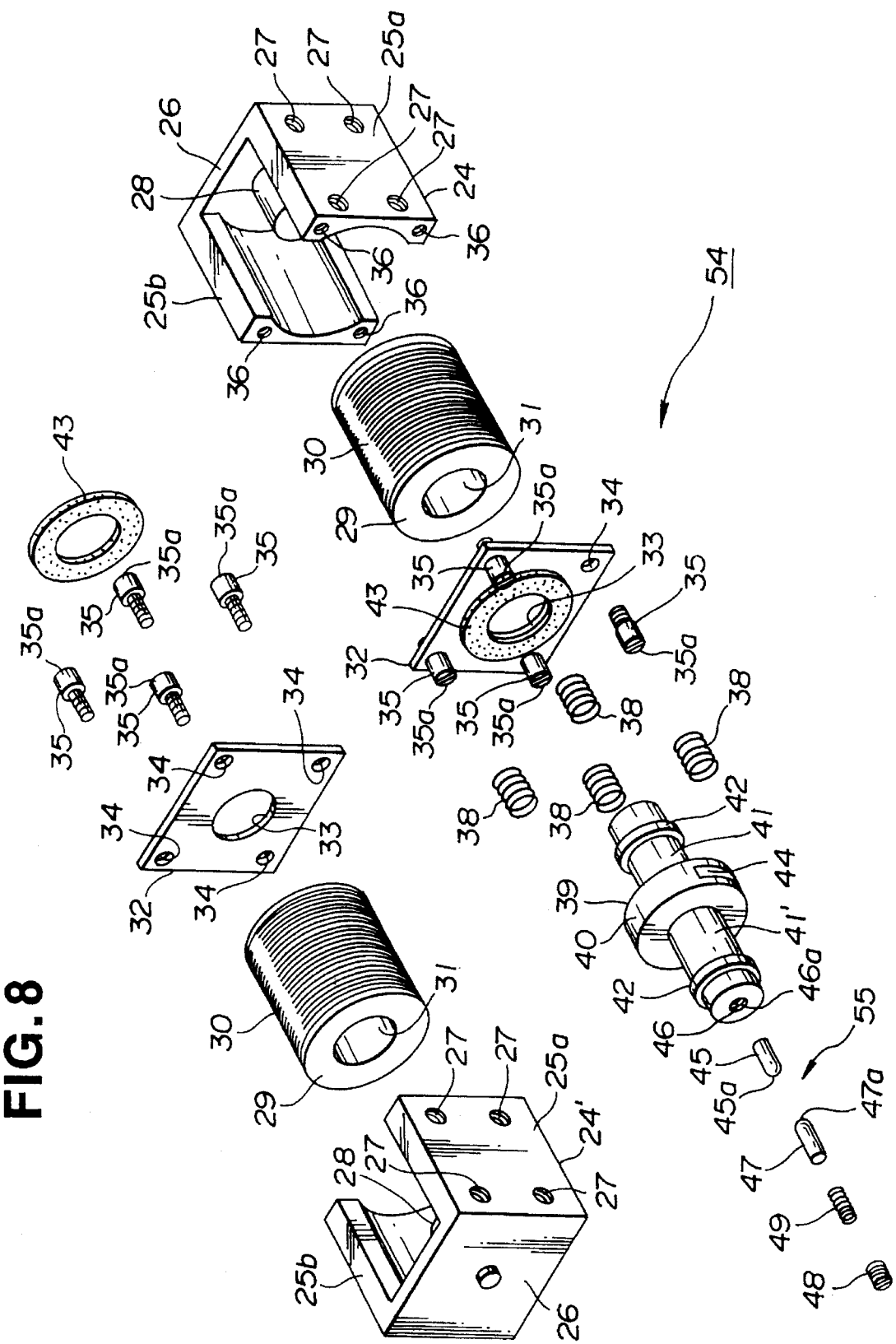
FIG. 8 is an exploded perspective view of an electromagnetic solenoid employed in the optical element rotating device of the first embodiment.

Referring now to the drawings, particularly to FIGS. 1 to 8, the optical element rotating device of the invention is exemplified in case of a wedge-shaped prism rotating device suitable for a liquid-crystal projector system. Particularly, the wedge-shaped prism rotating device is used for vertically offsetting a picture image included in the odd field and a picture image included in the even field, both images on a screen constructing one frame equivalent to a single complete picture, by one pixel, in synchronization with a vertical synchronizing signal in the video signal, as described later. As seen in FIG. 1, the wedge-shaped prism rotating device 1 of the first embodiment includes an optical element chassis 2 rotatably supporting the wedge-shaped prism 15 and a drive mechanism which is attached to the optical element chassis 2 for rotating the wedge-shaped prism 15 about its optic axis periodically in time clockwise and counterclockwise between predetermined two different phase angles of the wedge-shaped prism relative to the chassis. As seen in FIGS. 1–3, the chassis 2 has a front plate 3 being shaped in front view substantially into a square and a peripheral wall section 4 extending normal to the front plate 3. The front plate 3 and the peripheral wall section 4 are made of metal materials and integrally formed with each other by casting in a conventional manner. The front plate 3 has an essentially circular opening 5 in the substantially center section thereof. As clearly seen in FIG. 3, the front plate 3 is formed with four annular boss-like portions 6 respectively projecting perpendicularly to the back face of the front plate 3 at four places adjacent to the four corners of the plate. Each boss-like portion 6 has a mounting hole 6a consisting of a through opening, for assembling the wedge-shaped prism rotating device into the liquid-crystal projector system. Two roller support shafts 7 are fixed onto right and left upper sections of the back face of the front plate 3 in such a manner as to be projected perpendicular to the back face in the vicinity of the circular opening 5. Each roller support shaft 7 is arranged for rotatably supporting a roller 8, as shown in FIGS. 3 and 5. A pivot shaft 9 is attached onto the lower section of the back lace of the front plate 3, for pivotally supporting a roller pressure-contact arm 10. A pressure-contact roller 11 is rotatably attached to an essentially center section of the pressure-contact arm 10 so that the roller 11 is placed close to the lowermost position of the circular opening 5. A return spring 12 such as a coil spring is disposed between the top end of the arm 10 and the bottom of the peripheral wall section 4, to permanently bias the arm 10 in the counterclockwise direction. As seen in FIGS. 3, and 5–7, reference numeral 13 denotes a wedge-shaped prism support. The prism support 13 is comprised of a substantially annular prism support frame 14 and a prism actuating link 16 attached to the uppermost end (viewing FIG. 3) of the support frame 14. The wedge-shaped prism 15 is firmly fitted into the support frame 14. As seen in FIG. 7, the wedge-shaped prism 15 is rotatably supported by the support frame 14 such that the prism 15 has a maximum thickness at the leftmost end and a minimum thickness at the rightmost end. As seen in FIG. 5, the wedge-shaped prism is circularly shaped with respect to the optic axis thereof. The prism actuating link 16 is projected upwards from the uppermost end of the support frame 14. The link 16 has a plate-like prism actuating lever 17 upwardly extending from the center thereof. The support frame 14 has a substantially annular supported groove 18 on its outer periphery. As best seen in FIG. 5, the two rollers 8 rotatably engage with right and left upper portions of the annular groove 18, while the roller 11 rotatably engages with the lowermost portion of the annular groove 18 and is brought into pressure-contact with the groove 18 by virtue of the bias of the spring 12. The roller 11 is brought into rolling-contact with the groove 18 and acts to keep the two rollers 8 in rolling contact with the groove 18, by virtue of the spring 12. The spring 12 is so designed that the two rollers 8 are permanently kept in rolling contact with the groove 18 by maintaining the counterclockwise movement of the roller 11 against the dead weight of the prism sub-assembly consisting of the wedge-shaped prism 15 and the prism support 13. With this arrangement, the wedge-shaped prism 15 is assembled on the optical element chassis 2 in such a manner as to be free to rotate about its optic axis clockwise or counterclockwise. As shown in FIG. 7, the peripheral wall section 4 of the chassis 2 has a substantially rectangular cut-out 19 at its upper portion. The prism actuating lever 17 projects through the cut-out 19 upwards. The optical element chassis 2 is integrally formed with a solenoid casing 20 at the upper portion thereof. As clearly seen in FIG. 7, the solenoid casing 20 is comprised of a pair of side wall sections 21 and 21' opposing to each other and a front wall section 22 integrally formed with the side wall sections in such a manner as to interconnect front edges of the two side wall sections 21 and 21'. A plurality of yoke mounting holes 23 are formed at the front wall section 22. Each mounting hole 23 consists of an elliptical hole slightly elongated in the horizontal direction of the casing 20. Substantially C-shaped yoke members 24 and 24' are attached to the solenoid casing 20. As seen in FIG. 7, each yoke member has a pair of side wall sections 25a and 25b opposing to each other and a connection wall section 26 interconnecting the two side wall sections 25a and 25b. As shown in FIG. 8, one side wall section 25a of each yoke member has a plurality of female screw portions 27 each essentially conforming to either one of the yoke mounting elliptical holes 23 through which screws 37 are respectively screwed into the female screw portions 27, with the result that the yoke members 24 and 24' are firmly fixed onto the casing 20. As shown in FIG. 5, a substantially cylindrical stationary bobbin support 28 is attached to the center of the inner wall of the connection wall section 26 of each yoke member, such that the axial direction of the bobbin support 28 is identical to the longitudinal direction of the opposing yoke members 24 and 24'. A pair of coil bobbins 29 on each of which an exciting coil 30 is wound, are respectively supported on the stationary bobbin supports 28 fixed onto the yoke members 24 and 24'. Each bobbin 29 has an axially extending plunger guide hole 31. As shown in FIG. 5, each bobbin 29 is actually supported on the corresponding bobbin support 28 at its one end such that the plunger guide hole 31 is fitted onto the cylindrical bobbin support 31. On the other hand, each bobbin 29 is covered at the other end by a substantially square bobbin cover 32 made of a thin plate, during assembling. As clearly seen in FIG. 8, the bobbin cover 32 has a relatively large central opening 33 and four through openings 34 bored in the vicinity of the four corners thereof. On the other hand, each yoke member has four female screw portions 36 at the inside end of the two side wall sections 25a and 25b. Each female screw portion 36 conforms to either one of the through openings 34 through which headed male screws 35 are screwed into the female screws 36. In this manner, the inside opening end of each yoke member is covered by the bobbin cover 32, with the result that the respective bobbin is accommodated in the associated yoke member and in addition each bobbin is firmly fixed to the corresponding yoke member through abutment between the inside end of the bobbin 29 and the bobbin cover 32. When the cover 32 is mounted on the yoke member, the central opening 33 of the cover 32 is so dimensioned to conform to the plunger guide hole 31 of the bobbin 29. As illustrated in FIGS. 3–5 and 7, when assembled, the four heads 35a of the screws 35 received into the female screws 36 of the one-yoke member 24 are cooperative with the four heads 35a of the screws 35 received into the female screws 36 of the other yoke member 24', to form four opposing pair of heads. A compression spring 38 such as a coil spring is provided on each opposing pair of heads. The four compression springs 38 act on the opposing bobbin covers 32 so that the two bobbin covers are forced to move away from each other. As best seen in FIG. 5, a plunger 39, which is made of a magnetic material, is disposed in the guide holes 31 defined in the two bobbins 29 and the intermediate space defined between the opposing bobbin covers 32. The plunger 39 consists of a large-diameter central section 40 and two small-diameter sections 41 and 41' axially extending from both ends of the large-diameter section 40. The three sections 40, 41 and 41' are integrally formed with each other. The outside diameter of each small-diameter section is so dimensioned to be smaller than the inside diameter of the guide hole 31 so as to permit an axial sliding movement of the small-diameter section of the plunger relative to the corresponding bobbin. On the other hand, the outside diameter of the large-diameter section 40 is so dimensioned to be remarkably greater than the inside diameter of the guide hole 31. As seen in FIGS. 5 and 8, reference numeral 42 denotes a spacer ring fitted onto the outer periphery of each small-diameter section of the plunger 39 to permit the axial sliding movement of the plunger 39 in the plunger guide hole 31, while eliminating a clearance defined between the outer peripheral surface of the small-diameter section of the plunger 39 and the inner peripheral surface of the guide hole 31 at a minimum. For this reason, the outside diameter of the spacer 42 is so dimensioned to be equal to or slightly less than the inside diameter of the guide hole 31. Additionally, the respective spacers 42 are made of a synthetic resin material so as to provide a relatively small coefficient of friction in cooperation with materials from which the bobbin 29 are made, thereby providing a smooth axial sliding movement of the plunger relative to the stationary bobbins 29. With the previously-noted arrangement of the electromagnetic solenoid, exciting current applied alternatively on the two exciting coils 30 respectively wound on the right and left bobbins 29, causes reciprocating motion of the plunger 39 in the opposing axial directions. In this case, as seen in FIG. 5, rightward axial movement of the plunger is restricted by abutment between the essentially annular right-hand side wall of the large-diameter section 40 of the plunger and the right-hand side bobbin cover 32, while leftward axial movement of the plunger is restricted by abutment between the essentially annular left-hand side wall of the large-diameter section 40 of the plunger and the left-hand side bobbin cover 32. As best seen in FIG. 5, a pair of ring-shaped vibration isolation pads 43 are respectively adhered to the opposing faces of the bobbin covers 32, in order to prevent collision contact between the bobbin cover 32 and the large-diameter section 40 of the plunger and to smoothly stop the plunger at the right or left restricted position without any undesirable oscillating motion at the restricted position.

The plunger 39 has a substantially semi-circular slot 44 at the lower half thereof. As best seen in FIG. 5, the plunger 39 has an elongated axial bore 46 extending along the central axis of the plunger. The elongated axial bore 46 consists of a first axial bore 45b defined in the stepped section between the large-diameter section 40 and the left-hand side small-diameter section 41, a second axial bore 46b extending from tile stepped section between the large-diameter section 40 and the right-hand side small-diameter section 41' to tile left half of the right-hand side small-diameter section 41', and a screw-threaded bore 46a defined in the right half of the right-hand side small-diameter section 41'. A stationary, pin 45 is press-fitted into the first axial bore 45b. The stationary pin 45 has a semi-spherical top end 45a exposing the semi-circular slot 44. A movable pin 47 is slidably disposed in the second axial bore 46b. As seen in FIG. 5, the movable pin 47 has substantially the same geometry and dimensions as the stationary pin 45. The movable pin 47 has a semi-spherical top end 47a exposing the semi-circular slot 44 and opposing the semi-spherical top end 45a of the stationary pin 45. Reference numeral 48 denotes an adjusting screw which is threadably received in the screw-threaded bore 46a. A return spring 49 for instance a coiled helical compression spring is operably disposed between the flat end of the movable pin 47 and the adjusting screw 48. As appreciated from FIG. 5, the movable pin 47 is permanently forced to move towards the semi-spherical top end 45a of the stationary pin 45 by the bias of the spring 49. The magnitude of spring bias is properly adjusted by the adjusting screw 48.

A pair of plunger-stroke adjusting handles 50 are provided at both ends of the solenoid casing 20. Each adjusting handle 50 consists of a male screw portion 51 and a knob portion 52 both integrally formed with each other. Each male screw portion 51 is threadably received in a female screw portion 53 formed at each side wall section of the solenoid casing 20. The two adjusting handles 50, the two bobbin supports 28 attached to the yoke members 24 and 24', and the plunger 39 are coaxially arranged to each other. The inside flat end of the male screw portion 51 of the adjusting handle abuts the connection wall section 26 of the yoke member. The adjusting handles are arranged to adjust a reciprocating stroke of the plunger 39. Under a condition wherein the yoke mounting screws 37 are released, the yoke members 24 and 24' are spring-loaded to move away from each other by the bias of the four coil springs 38. The maximum permissible axial outward movement of each yoke member is restricted by abutment between the connection wall section 26 and the inside flat end of the male screw portion 51. Thus, the reciprocating stroke of the plunger 39 can be varied by adjusting a relative position of the male screw portion 51 to the female screw portion 53 by screwing the male screw portion 51 into the female screw portion 53. After adjustment of the reciprocating stroke of the plunger, the yoke mounting screws 37 are securely tightened, and thus the two yoke members 24 and 24' are firmly fixed onto the solenoid casing 20. As explained above, the electromagnetic solenoid 54 is assembled. The plunger 39 of the solenoid 54 is mechanically linked to the prism support 13 with the wedge-shaped prism 15, as hereinbelow described in detail.

The stationary pin 45, the movable pin 47, the adjusting screw 48 and the spring 49 constructs a joint 55 which joint mechanically links the wedge-shaped prism subassembly to the solenoid plunger 39. As illustrated in FIGS. 3 and 5, the prism actuating lever 17 of the prism support 13 is mechanically linked to the joint 55 in such a manner that the actuating lever 17 is resiliently sandwiched between the semi-spherical top end 45a of the stationary pin 45 and the semi-spherical top end 47a of the movable pin 47 and additionally the both flat surfaces of the prism actuating lever 17 are brought into pressure-contact with the semi-spherical surfaces of the top ends 45a and 47a, respectively. With this arrangement of the optical element rotating device of the first embodiment, when the exciting current is alternately applied to the two exciting coils 30 of the solenoid 54, the plunger 39 is reciprocated between two positions, namely one being an abutment position between the left-hand side wall of the large-diameter section 40 of the plunger and the left vibration-isolation pad 43 and the other being an abutment position between the right-hand side wall of the large-diameter section 40 and the right vibration-isolation pad 43, as seen in FIG. 5. The reciprocating motion of the plunger 39 produces an oscillating rotational movement of the prism support 13 about the optic axis of the wedge-shaped prism 15 periodically in time clockwise and counterclockwise between predetermined two different phase angles of the prism relative to the optical element chassis 2. With the oscillating motion of the prism support 13, the prism actuating lever 17 is slightly inclined with respect to the vertical line, thereby increasing the distance defined between two contact points, one being a contact point between the spherical top end 45a of the stationary pin and the left flat surface of the lever 17, and the other being a contact point between the spherical top end 47a of the movable pin and the right flat surface of the lever 17. Even when the distance between the two spherical top ends 45a and 47a is varied, the prism actuating lever 17 can be stably kept in pressure-contact with the two pins 45 and 47 with self-adjustable friction, by virtue of the spring 49. As appreciated from FIG. 5, as the male screw portion 51 of the left-hand side adjusting handle 50 is further screwed into the female screw portion 53 of the solenoid casing 20, the clearance between the left vibration-isolation pad 43 and the left-hand side wall of the large-diameter section 40 is decreased and thus the maximum permissible leftward axial displacement of the plunger 39 from the neutral position illustrated in FIG. 5 of the plunger is decreased. This means a decrease in the counterclockwise angular displacement of the prism support 13 relative to the neutral position illustrated in FIG. 5. In contrast to the above, as the male screw portion 51 of the right-hand side adjusting handle 50 is further screwed into the female screw portion 53 of the solenoid casing 20, the clearance between the right vibration-isolation pad 43 and the right-hand side wall of the large-diameter section 40 is decreased and thus the maximum permissible rightward axial displacement of the plunger 39 from the neutral position of the plunger is decreased. This means a decrease in the clockwise angular displacement of the prism support 13 relative to the neutral position. That is, the stroke adjustment of the plunger 39 also means an adjustment of maximum permissible inclined angles of the prism 15 relative to the neutral position in the clockwise and counterclockwise directions.

Figure 9:
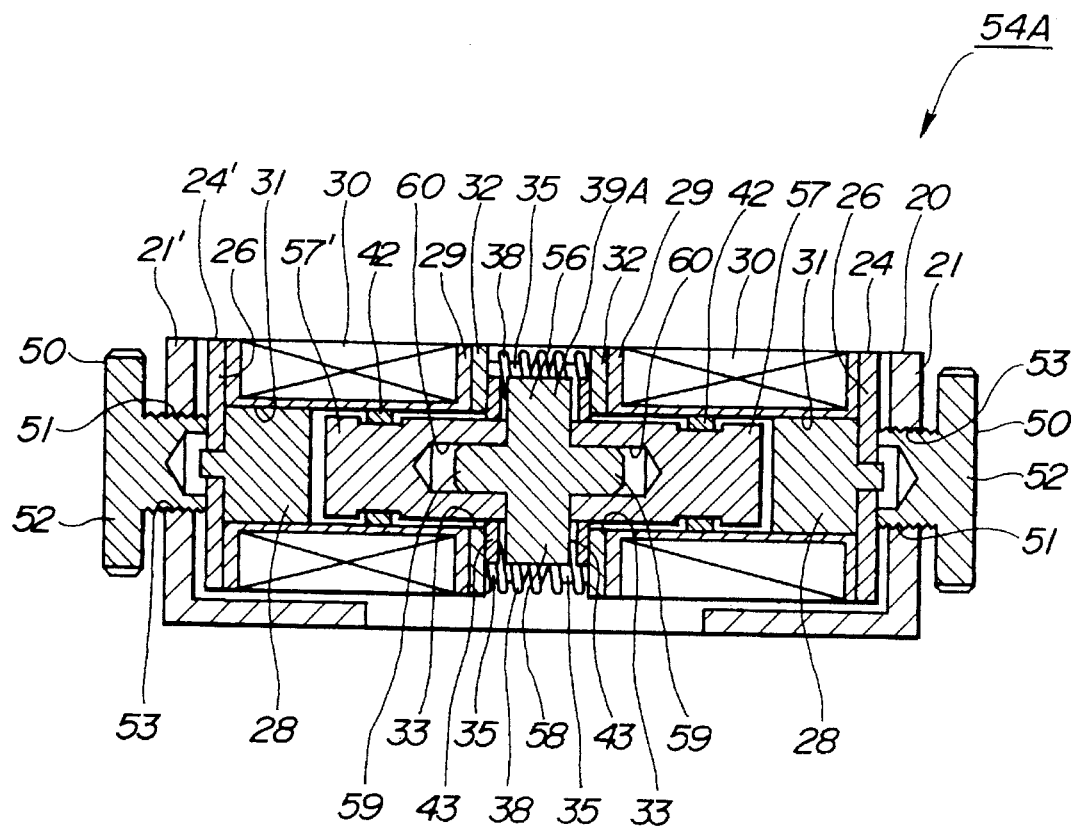
FIG. 9 is a cross-sectional view illustrating a modification of the solenoid plunger of the solenoid employed in the optical element rotating device of the first embodiment.

Referring now to FIG. 9, there is shown a modification of the solenoid plunger. The modified plunger 39A is different from the plunger 39 shown in FIGS. 1–8, in that the plunger 39A comprises a three-piece plunger. The three-piece plunger 39A consists of a relatively large-diameter center disc 56 and a pair of small-diameter side rods 57 and 57'. The center disc 56 is made of a non-magnetic material, such as ceramics. The disc 56 has a main disc portion 58 and a pair of connection-shaft portions 59 axially extending from the side walls of the main disc portion 58. The main disc portion 58 and the two connection-shaft portions 59 are integrally formed with each other. On the other hand, each of the small-diameter side rods 57 and 57' is cylindrical in shape and made of a magnetic material. The outside diameter of the side rod is smaller than that of the disc portion 58 and greater than that of the connection-shaft portion 59. As seen in FIG. 9, each side rod has an axial bore 60 bored along the central axis thereof. When assembled, one of the side rods 57 and 57' is press-fitted onto either one of the connection-shafts 59 through its axial bore 60, while the other side rod is press-fitted onto the other connection-shaft.

For the purpose of a rigid connection of the three plunger parts, adhesive is often applied on the connecting surfaces. In the embodiment, although the three plunger parts are connected to each other by press-fitting, the connection of the three plunger parts may be achieved by screwed-fitting. In this case, each connection-shaft portion 59 is formed with a male screw section on the outer periphery thereof, while the axial bore 60 of each side rod is formed with a female screw section on the inner periphery thereof, so that the female screw section of the side rod is brought into screwed connection with the male screw section of the disc 56. In the same manner as the plunger 39, a spacer ring 42 is fitted on the outer periphery of the small-diameter side rod of the plunger 39A. During assembling, the three-piece plunger 39A is incorporated into the coil bobbins 29 such that the small-diameter side rods 57 and 57' are inserted into the plunger guide holes 31 defined in the two bobbins 29 and the center disc portion 58 is disposed between the inside ends of the bobbins 29. In this manner, another electromagnetic solenoid 54A is constructed with the three-piece plunger 39A. In FIG. 9, assuming that the left-hand side exciting coil 30 of the solenoid 54A is energized, the left exciting coil 30 produces a magnetic loop in cooperation with a series of magnetic parts, namely the left coil bobbin 29, the left stationary bobbin support 28, and the left magnetic side rod of the plunger 39A. As a result, magnetic attracting force is produced by way of the left stationary bobbin support 28 acting as a magnetic leakage member. The attraction force acts on the left-hand side rod opposing to the left stationary bobbin support 28 in a manner so as to cause the axial leftward movement of the plunger 39A. The solenoid 54A is superior to the solenoid 54, because the non-magnetic disc 56 prevents magnetic flux required to produce attraction force for one side rod 57' of the plunger 39A from leaking towards the other side rod 57 without any attraction force between the other side rod 57 and the right stationary bobbin support 28, and thereby effectively reduces energy loss.

Second embodiment

Figure 10:
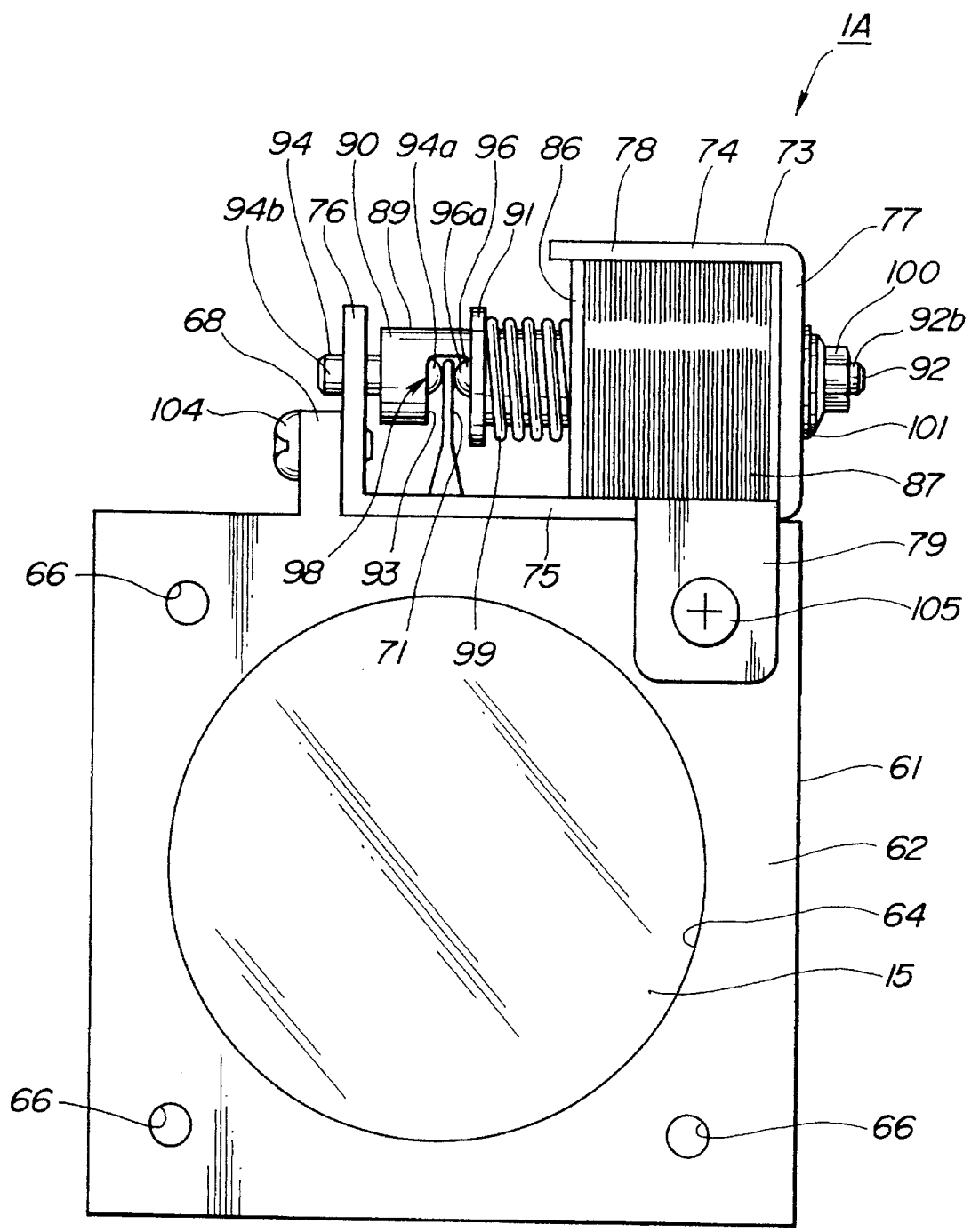
FIG. 10 is a front elevational view illustrating a second embodiment of an optical element rotating device according to the invention.
Figure 11:
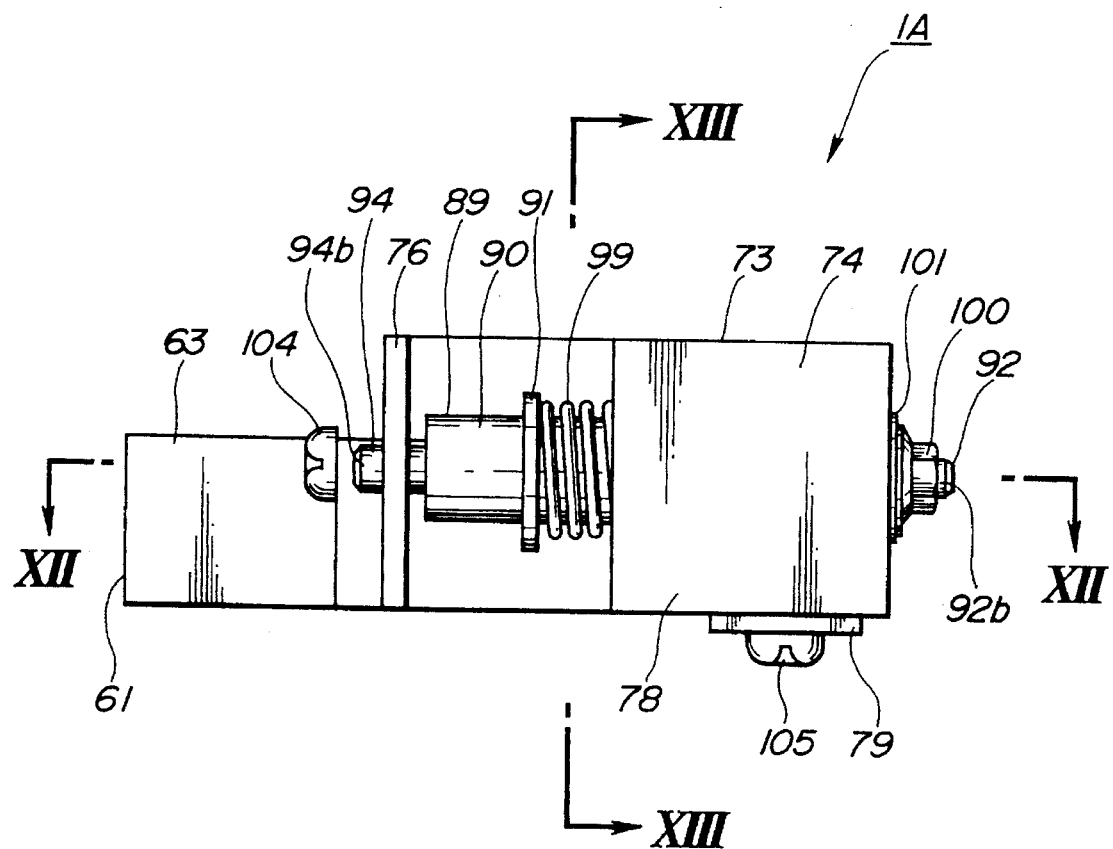
FIG. 11 is a top view of the optical element rotating device of the second embodiment.
Figure 12:
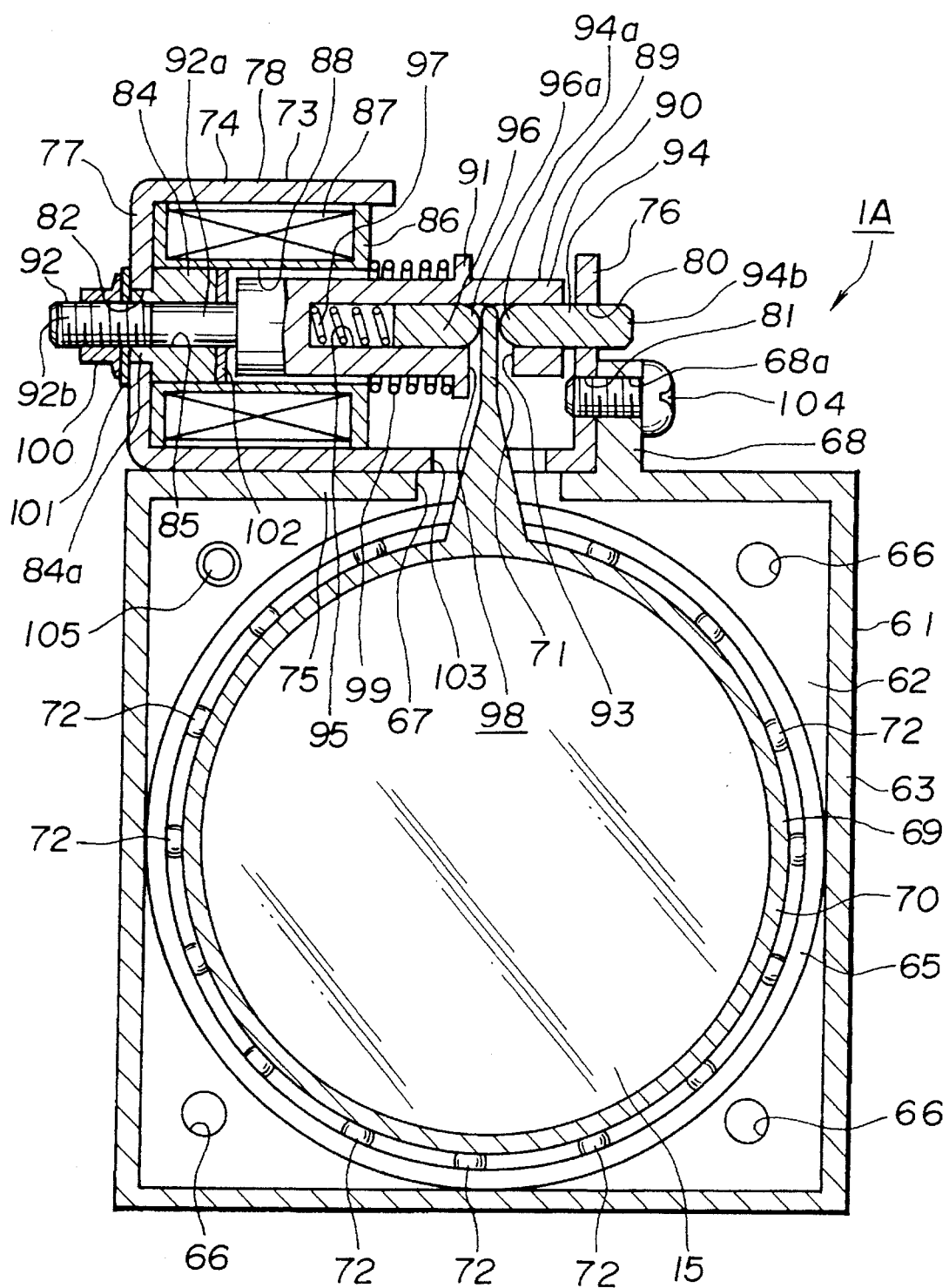
FIG. 12 is a cross-sectional view taken along the line XII—XII in FIG. 11.
Figure 13:
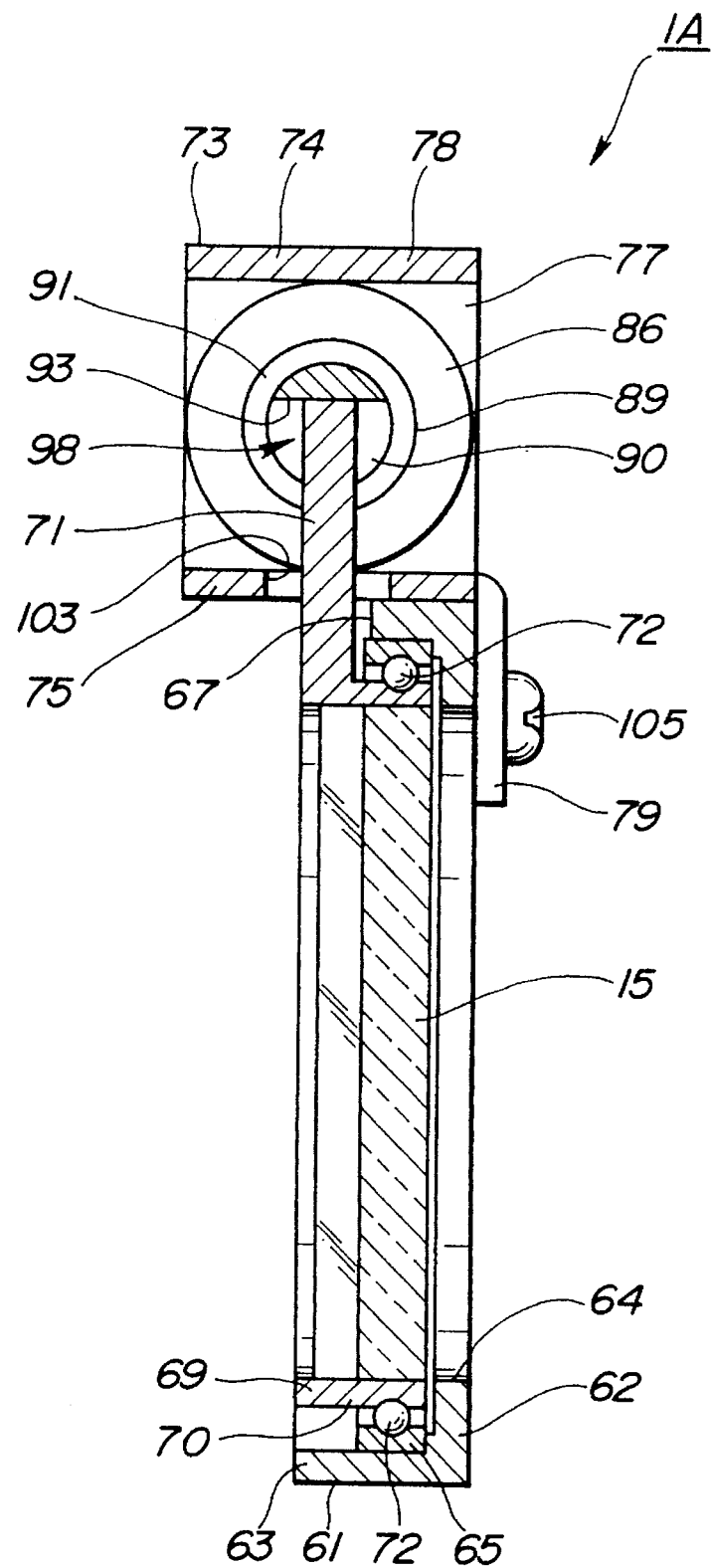
FIG. 13 is a cross-sectional view taken along the line XIII—XIII in FIG. 11.
Figure 14:
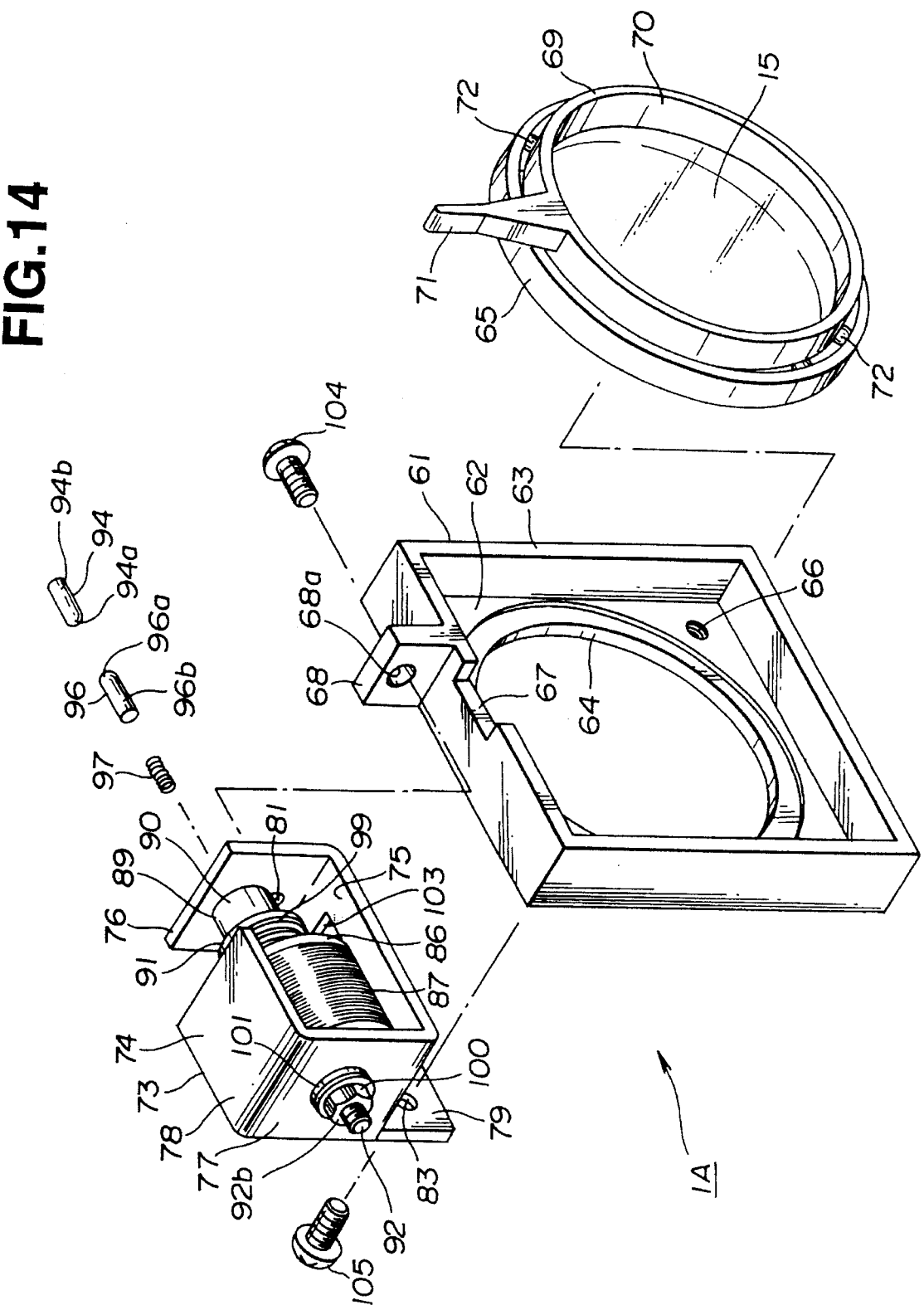
FIG. 14 is an exploded perspective view illustrating the optical element rotating device of the second embodiment.

Referring now to FIGS. 10 to 14, there is shown a second embodiment of the optical element rotating device of the invention. The optical element rotating device 1A of the second embodiment is also exemplified in case of a wedge-shaped prism rotating device suitable for a liquid-crystal projector system. The basic construction of the optical element rotating device of the second embodiment as shown in FIGS. 10–14 is similar to that of the first embodiment as shown in FIGS. 1–7. Therefore, the same reference numerals used in the first embodiment of FIGS. 1–7 will be applied to the corresponding elements used in the second embodiment of FIGS. 10–14, for the purpose of comparison between the first and second embodiments. As appreciated from FIG. 12, the second embodiment is different from the first embodiment in that the solenoid incorporated in the optical element rotating device 1A of the second embodiment is a single exciting coil type electromagnetic solenoid 73 and additionally a wedge-shaped prism support 69 functions as an inner race of a radial bearing rotatably supporting the prism 15 on an optical element chassis 61. The chassis 61 consists of a front plate 62 being shaped in font view substantially into a square and a peripheral wall section 63 extending perpendicular to the front plate 62. The front plate 62 and the peripheral wall section are integrally formed with each other. As seen in FIG. 10, the front plate 62 has an essentially circular opening 64 in the substantially center section thereof. As best seen in FIGS. 12 and 13, an essentially annular outer race 65 is fitted to the front plate 62 in such a manner as to surround the opening 64. The front plate 62 is also formed with four mounting female screw-threaded portions 66 respectively provided at four corners of the plate. The peripheral wall section 63 of the chassis 61 has a substantially rectangular cut-out 67 at its upper portion. As seen in FIG. 12, an upwardly projecting solenoid-mounting portion 68 is integrally formed with the upper portion of the peripheral wall section 63 in the vicinity of the cut-out 67 at the right-hand side of the upper portion. As seen in FIG. 14, the solenoid mounting portion 68 has a through-opening 68a. As illustrated in FIG. 12, reference numeral 69 denotes a wedge-shaped prism support. The prism support 69 consists of a substantially annular prism support frame 70 and a prism actuating lever 71 attached to the uppermost end (viewing FIG. 12) of the support frame 70. The support frame 70 and the prism actuating lever 71 are integrally formed with each other. The wedge-shaped prism 15 is fitted into the support frame 70. The wedge-shaped prism support frame 70 serves as the inner race which is free to rotate about the center axis of the outer race 65 by way of a plurality of balls 72. As appreciated from FIG. 12, the outer race 65, the prism support frame serving as the inner race 70, the balls 72 are cooperative with each other to construct a radial ball bearing for the wedge-shaped prism 15. In this manner, the wedge-shaped prism 15 is rotatably supported by the support frame 70. The prism actuating lever 71 is projected upwards through the cut-out 67 formed at the upper portion of the peripheral wall section 63 and a cut-out 103 formed at a solenoid yoke member 74 as explained later. As shown in FIG. 12, reference numeral 73 denotes an electromagnetic solenoid attached onto the upper portion of the peripheral wall section 63 of the chassis 61. The solenoid 73 includes a yoke member 74 firmly secured onto the upper portion of the peripheral wall section 63. In actual, the yoke member 74 serves as a solenoid casing. As seen in FIG. 12, the yoke member 74 consists of a horizontally extending bottom plate section 75, a right-hand side plate section 76 upwardly bent at one end of the bottom plate section 75, a left-hand side plate section 77 upwardly bent at the other end of the bottom plate section 75, and a rightwardly extending upper plate section 78 bent horizontally at the uppermost end of the left-hand side plate section 77. As best seen in FIGS. 13 and 14, the yoke member 74 also includes a downwardly extending tab-like solenoid mounting plate section 79 integrally formed with the bottom plate section 75. The bottom plate section 75, the right-hand side plate section 76, the left-hand side plate section 77, the upper plate section 78, and the tab-like plate section 79 are integrally formed with each other, and made of a magnetic material. The right-hand side plate section 76 has a stationary pin support through-opening 80 and a female screw hole 81, while the left-hand side plate section 77 has a bobbin support mounting hole 82 so that the hole 82 opposes to the stationary pin support through-opening 80. As best seen in FIG. 14, the tab-like plate section 79 has a through opening 83. As shown in FIG. 12, a substantially cylindrical stationary bobbin support 84 is firmly fitted into the mounting hole 82 through its small-diameter section 84a. The stationary bobbin support 84 has an axial bore 85. A coil bobbin 86 on which an exciting coil 87 is wound, is supported on the stationary bobbin support 84 fixed onto the yoke member 74. The bobbin 86 has an axially extending plunger guide hole 88. As appreciated from FIG. 12, the bobbin 86 is supported on the bobbin support 84 at its one end such that the plunger guide hole 88 is fitted onto the large-diameter portion of the bobbin support 84. A left-hand portion of a plunger 89, which is made of a magnetic material, is disposed in the guide hole 88. The plunger 89 comprises a cylindrical large-diameter main plunger portion 90, a flanged portion 91 integrally formed with the main plunger portion 90, and an axially leftwardly extending small-diameter rod portion 92. As seen in FIG. 12, the right half of the rod portion 92 consists of a parallel-pin like slidable portion 92a slidably fitted into the axial bore 85 of the bobbin support 84, while the left half of the rod portion 92 consists of a male screw portion 92b. The plunger 89 has a substantially semi-circular slot at the lower half thereof. The plunger 89 also has an elongated axial bore 95 communicating with the slot 93. A stationary pin 94 is press-fitted into the inlet portion of the axial bore 95. The stationary pin 94 has a semi-spherical surface at the inner end 94a thereof. The stationary pin 94 is actually press-fitted into the axial bore 95 so that only the semi-spherial surface of the stationary pin 94 is projected into the slot 93. The other end 94b of the stationary pin 94 is projected outwards from the end surface of the main plunger portion 90 and slidably supported by the stationary pin support through-opening 80 of the yoke member. A movable pin 96 is slidably disposed in the left-hand side of the axial bore 95 with respect to the slot 93. The movable pin 96 has a semi-spherical surface at its one end 96a and a flat end surface at the other end. A return spring 97 such as a coiled helical compression spring is operably disposed between the flat end surface of the movable pin 96 and the bottom of the axial bore 95, so that the semi-spherical top end 96a of the movable pin 96 is permanently forced to move towards the semi-spherical top end 94a of the stationary pin 94. The stationary pin 94, the movable pin 96, and the spring 97 constructs a joint 98 for mechanically linking the wedge-shaped prism subassembly to the solenoid plunger 89. A return spring 99 is also provided between the flanged portion 91 of the plunger 89 and the end surface of the coil bobbin 86, and operably fitted onto the main plunger portion 90, to permanently bias the plunger 89 towards the right-hand side plate section 76 of the yoke member 74. Reference numeral 100 denotes a plunger-stroke adjusting nut which is threadably received on the male screw portion 92b of the rod portion 92 of the plunger. As seen in FIG. 12, the adjusting nut 100 consists of a hexagon flange nut, for instance. Reference numeral 101 denotes an essentially annular vibration-isolation pad which is adhered to the left-hand side plate section 77 of the yoke member 74 such that the vibration-isolation pad 101 opposes the flanged section of the nut 100. Another vibration-isolation pad 102 is adhered to the end surface of the bobbin support 84 opposing to the stepped portion defined between large-diameter main plunger portion 90 and the small-diameter rod portion 92. The vibration-isolation pad 101 is arranged for preventing a collision contact between the adjusting nut 100 and the left-hand side plate section 77 of the yoke member, while the vibration-isolation pad 102 is arranged fro preventing a collision contact between the bobbin support 84 and the stepped portion of the plunger 89. In the event that the solenoid 73 is activated and thus the exciting coil 87 is energized, magnetic attracting force is produced by way of the stationary bobbin support 84 acting as a magnetic leakage member. The attraction force acts on the main plunger portion 90 in such a manner as to cause the axial leftward movement of the plunger 89. Upon the solenoid 73 is shifted from the energized state to the de-energized state, the plunger 89 is kept in the rightmost position by the bias of the spring 99. As appreciated from the above, when exciting current is cyclically applied to the exciting coil 87 of the solenoid, the plunger 89 reciprocates between two positions, namely one being an abutment position between the stepped portion of the plunger 89 and the vibration-isolation pad 102 and the other being an abutment between the flanged portion of the adjusting nut 100 and the vibration-isolation pad 101. As explained later, the reciprocating motion of the plunger 89 produces an oscillating rotational movement of the prism support 69 about the optic axis of the wedge-shaped prism 15 periodically in time clockwise and counterclockwise between predetermined two different phase angles of the prism relative to the optical element chassis 61. The reciprocating stroke of the plunger 89 can be adjusted by way of the adjusting nut 100. As appreciated from FIG. 12, as the adjusting nut 100 is further screwed onto the male screw portion 92b of the plunger rod portion 92, the clearance between the vibration-isolation pad 102 and the stepped portion of the plunger 89 is decreased and thus the maximum permissible leftward axial displacement of the plunger 89 relative to the spring-biased position (the rightmost position of the plunger) is decreased. In this manner, the reciprocating stroke of the plunger 89 can be adjusted by adjusting the screwing amount of the adjusting nut 100 on the male screw portion 92b. As appreciated from the above, the bobbin support 84 serves as a stopper which restricts both an inward axial movement of the plunger into the guide hole 88 and an outward axial movement of the plunger from the guide hole 88. The solenoid 73 is assembled on the optical element chassis 61, as follows.

First of all, the bottom plate section 75 of the yoke member 74 is arranged on the upper portion of the peripheral wall section 63 of the chassis 61. A solenoid mounting screw 104 is brought into screwed engagement with the female screw hole 81 of the right-hand side plate section 76 of the yoke member 74 through the through-opening 68a of the solenoid mounting portion 68. A solenoid mounting screw 105 is brought into screwed engagement with the female screw-threaded portion 66 through the through-opening 83 of the tab-like solenoid mounting plate section 79. In this manner, the solenoid is mounted on the upper portion of the chassis 61. Thereafter, as shown in FIGS. 10 and 12, the prism actuating lever 71 of the prism support 69 is mechanically linked to the joint 98 in such a manner that the actuating lever 71 is resiliently sandwiched between the semi-spherical top end 94a of the stationary pin 94 and the semi-spherical top end 96a of the movable pin 96 and additionally the both flat surfaces of the prism actuating lever 71 are brought into pressure-contact with the semi-spherical surfaces of the top ends 94a and 96a, respectively. With this arrangement of the optical element rotating device of the second embodiment, when the exciting current is applied to the exciting coil 87 of the solenoid 73 periodically in time, the plunger 89 is reciprocated between the two restricted positions. The reciprocating motion of the plunger 89 produces an oscillating rotational movement of the prism support 69 about the optic axis of the wedge-shaped prism 15 periodically in time clockwise and counterclockwise between predetermined two different phase angles of the prism relative to the optical element chassis 61.

Figure 15:
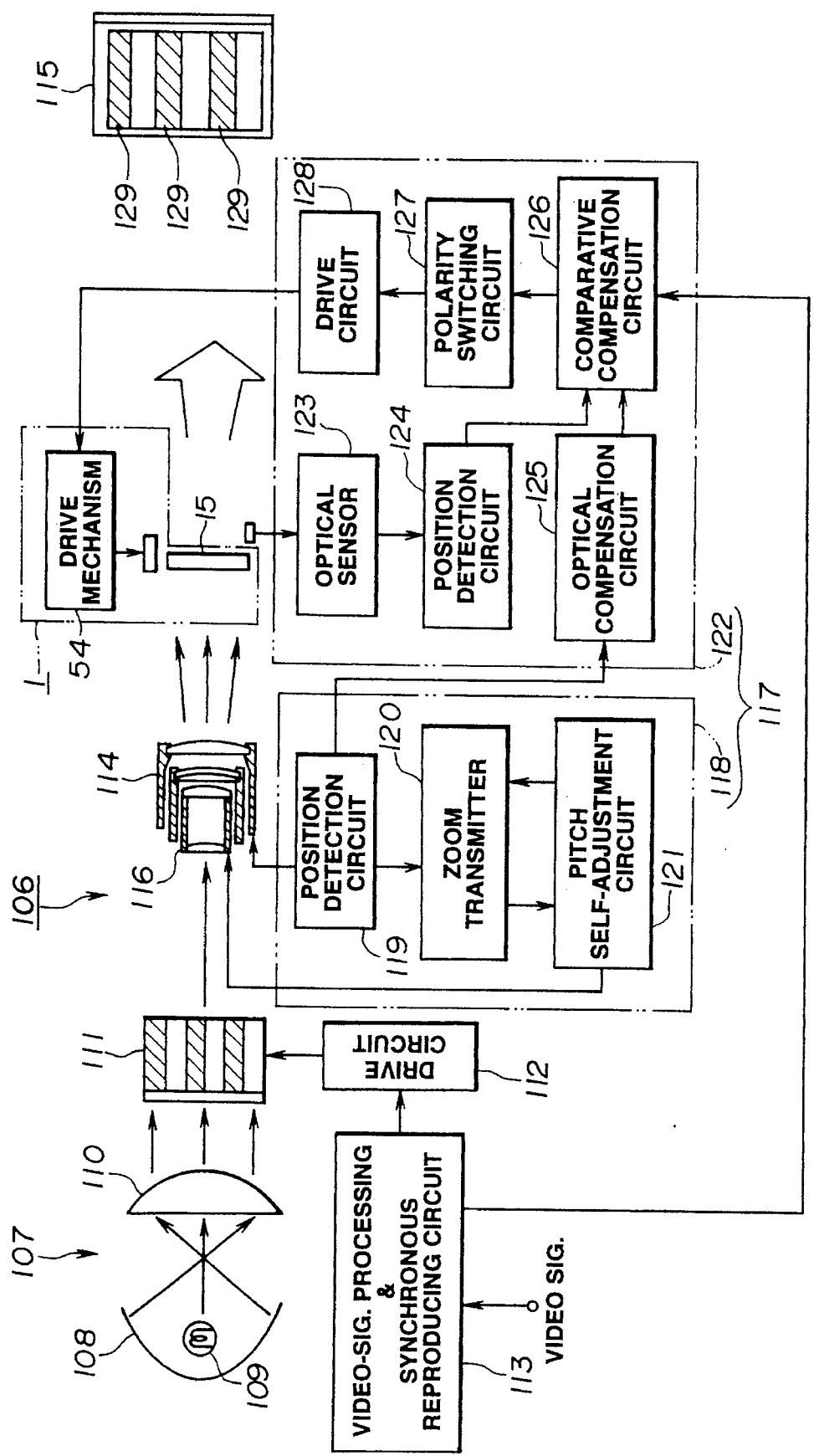
FIG. 15 is a schematic system diagram illustrating a liquid-crystal projector system according to the invention, in case of reproduction of a video signal included in an odd field.
Figure 16:
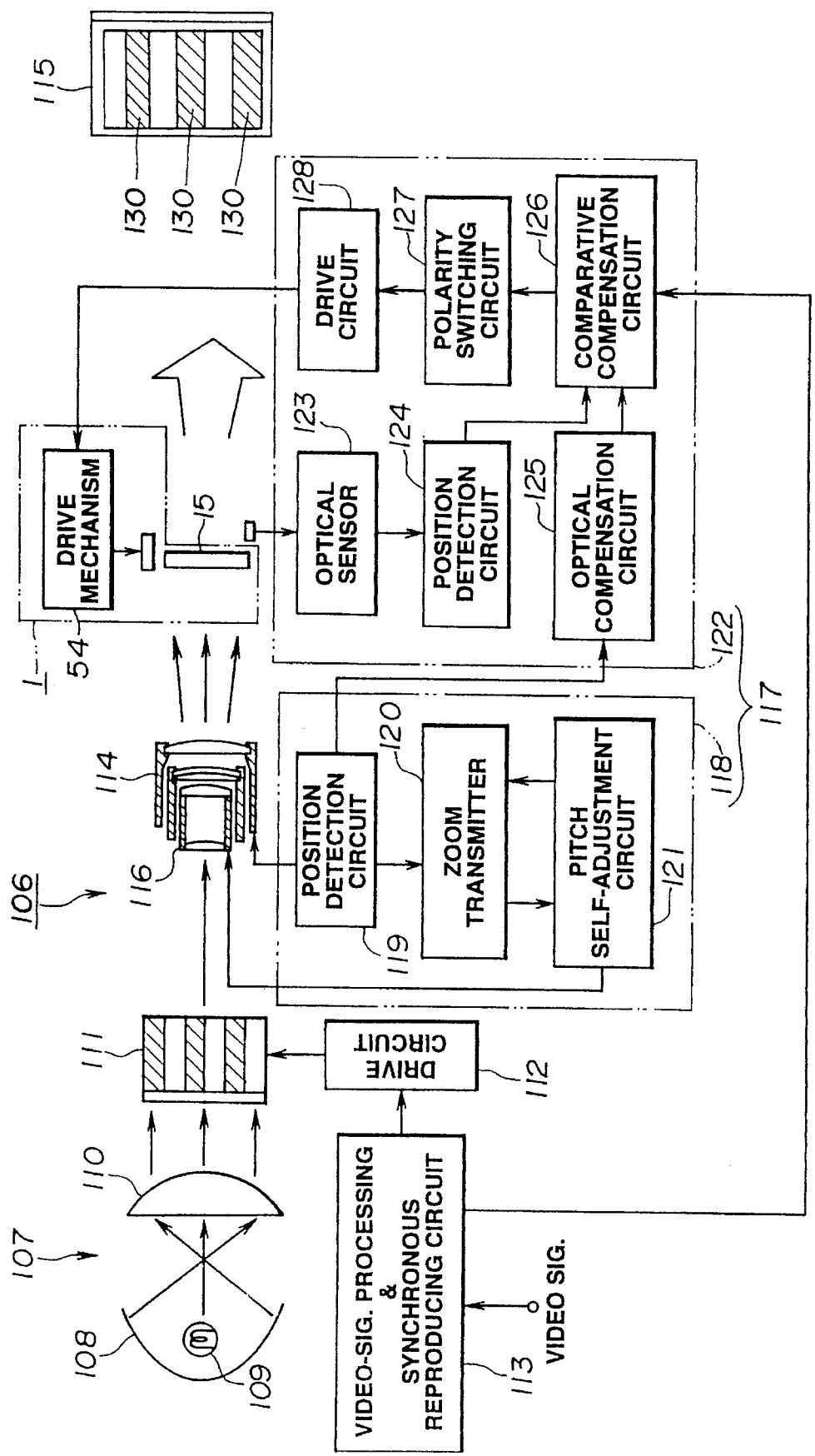
FIG. 16 is a schematic system diagram illustrating the liquid-crystal projector system, in case of reproduction of a video signal included in an even field.

Referring now to FIGS. 15 and 16, there is shown a liquid-crystal projector 106 utilizing the optical element rotating device according to the invention. Reference numeral 107 denotes a light source. The light source 107 includes a reflector 108, an electric lamp 109 which is located at a predetermined position with respect to the reflector 108, and a condensing lens 110 which is located at the front of the reflector 108 to face the reflecting surface of the reflector 108. The arrangement of the light source 107 provides a bundle of parallel rays. Reference numeral 111 denotes a liquid-crystal panel arranged frontward of the light source 107. The liquid-crystal panel 111 is driven by a liquid-crystal panel drive circuit. 112. The liquid-crystal panel drive circuit 112 is responsive to the signal from a video-signal processing and synchronous reproducing circuit 113, for displaying alternately a video signal included in an odd field and a video signal included in an even field, at a predetermined period of time by way of the same pixels of the liquid-crystal panel 111. Switching of display of the picture images respectively included in the odd field and the even field is executed in synchronization with a vertical synchronizing signal in the video signal. Also provided is a projection lens set 114 consisting of a group of projection lenses and a movable focus-adjustment lens 116. The bundle of rays passing through the liquid-crystal panel 111 is projected on a screen 115 by virtue of the projection lens set 114. The wedge-shaped prism rotating device 1 according to the invention is arranged frontward of the projection lens set 114. Reference numeral 117 denotes a control unit which consists of a projection lens control circuit 118 and a wedge-shaped prism control circuit 122. The control unit generates a control signal indicative of a calculated rotational angle of the prism 15, as explained later. The projection lens control circuit 118 includes a position detection circuit 119, zooming transmitter 120, and a pitch self-adjustment circuit 121. The position detection circuit 119 is provided for detecting the distance between the screen 115 and the projection lens 114. The detected distance is transmitted via the zoom transmitter 120 to the pitch self-adjustment circuit 121. The pitch self-adjustment circuit 121 is responsive to the detected distance, for varying the position of the movable lens 116 for the purpose of focus adjustment. The wedge-shaped prism control circuit 122 includes an optical sensor 123, a position detection circuit 124, an optical compensation circuit 125, a comparative compensation circuit 126, a polarity switching circuit 127, and a drive circuit 128. The position detection circuit 124 detects an angular position of the wedge-shaped prism 15. The comparative compensation circuit 126 receives both the distance information which is transmitted from the position detection circuit 119 via the optical compensation circuit 125, and the angular position information which is transmitted from the position detection circuit 124, and compares the distance information with the angular position information to determine a desired rotational angle of the wedge-shaped prism 15. The drive circuit 128 is responsive to the determined rotational angle of the prism 15, to reciprocatively rotate the prism 15 clockwise and counterclockwise by changing the polarity of the electrical signal to be output to a drive mechanism 54, namely an electromagnetic solenoid, in synchronization with the vertical synchronizing signal in the video signal. Respectively in case of the odd-field reproduction and in case of the even-field reproduction, the picture image included in the odd field can be vertically offset to the picture image included in the even field by one pixel, in synchronization with the vertical synchronizing signal in the video signal. For instance, in case of odd-field reproduction, the prism 15 is rotated in one rotational direction with the result that the picture image included in the odd field is projected at positions 129 on the screen 115, as shown in FIG. 15. In case of even-field reproduction, the prism 15 is rotated in the other rotational direction with the result that the picture image included in the even field is projected at positions 130 on the screen 115, as shown in FIG. 16. Accordingly, though even the projector utilizes a liquid-crystal panel, the projector can distinctly display the projected images.

As will be appreciated from the above, the optical element rotating device according to the invention can vertically shift the bundle of rays transmitted through the wedge-shaped prism at a predetermined cycle, by reciprocatively rotate the prism about its optic axis clockwise and counterclockwise. Thus, if the optical element rotating device of the invention is incorporated into the optical path of the liquid-crystal projector, a more distinct display for picture images may be ensured. In the event that the optical element rotating device of the invention is arranged between a conventional liquid-crystal projector and a screen and additionally the rotating cycle of the wedge-shaped prism is controlled in synchronization with a vertical synchronizing signal in the video signal, the conventional liquid-crystal projector could be used as a distinct-display type liquid-crystal projector.

Since an electromagnetic solenoid for an optical element rotating device according to the invention can reciprocate its solenoid plunger at a predetermined cycle, the solenoid can optimally applied for rotating a driven optical element such as a wedge-shaped prism periodically in time at a predetermined cycle.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An optical element rotating device comprising:

a single one-piece circular prism having a wedge-shaped cross-section wherein a maximum thickness occurs at one end of a diameter and a minimum thickness occurs at the other end of the diameter;

an optical element chassis rotatably supporting said prism so as to be rotatable about an optic axis of said prism; and motorized drive means attached to said optical element chassis, for cyclically rotating said prism clockwise and counterclockwise between two different predetermined phase angles of said prism with respect to said optical element chassis.

2. An optical element rotating device comprising:

a wedge-shaped prism having a maximum thickness at one side and a minimum thickness at the other side;

an optical element chassis rotatably supporting said wedge-shaped prism so as to rotatable about an optic axis of said prism; and a drive mechanism attached to said optical element chassis, for cyclically rotating said prism clockwise and counterclockwise between two different predetermined phase angles of said prism with respect to said optical element chassis;

wherein two stationary rollers are rotatably supported on said optical element chassis, and a pressure-contact roller is movably and rotatably mounted on said optical element chassis, wherein said wedge-shaped prism has a circular shape with respect to its optic axis, and wherein a biasing means is arranged for permanently biasing said pressure-contact roller in a direction which biases said prism into pressure contact with said stationary rollers, whereby an outer periphery of said prism is rotatably supported on said optical element chassis by said three rollers.

3. An optical element rotating device comprising:

a wedge-shaped prism having a maximum thickness at one side and a minimum thickness at the other side;

an optical element chassis rotatably supporting said wedge-shaped prism so as to rotatable about an optic axis of said prism; and a drive mechanism attached to said optical element chassis, for cyclically rotating said prism clockwise and counterclockwise between two different predetermined phase angles of said prism with respect to said optical element chassis;

wherein said wedge-shaped prism has a circular shape with respect to its optic axis and is supported by a circular prism support frame, said support frame including a plurality of ball bearings, an inner ball race, and an outer ball race, the outer ball race being fixed to said optical element chassis and arranged with the inner race so that the plurality of balls are rotatably disposed therebetween and so that said prism is rotatably supported on said optical element chassis by said ball bearings.

4. An optical element rotating device comprising:

a wedge-shaped prism having a maximum thickness at one side and a minimum thickness at the other side;

an optical element chassis rotatably supporting said wedge-shaped prism so as to rotatable about an optic axis of said prism; and a drive mechanism attached to said optical element chassis, for cyclically rotating said prism clockwise and counterclockwise between two different predetermined phase angles of said prism with respect to said optical element basis;

wherein said drive mechanism includes an electromagnetic solenoid, and wherein a plunger of said solenoid is mechanically linked to said prism so that a rectilinear reciprocating motion of said plunger is converted into a rotary motion of said prism about the optic axis.

5. The optical element rotating device as set forth in claim 4, said plunger being made of a magnetic material and having a large-diameter section at its center portion and two small-diameter sections at both ends, said electromagnetic solenoid further comprising:

a pair of coil bobbins each winding thereon an exciting coil and having a guide hole which hole receives therein the corresponding small-diameter section of said plunger; and a solenoid casing supporting said coil bobbins so that said bobbins oppose each other;

wherein opposing inside end faces of said bobbins act to restrict an axial movement of said plunger in two opposing axial directions by abutment between the inside end face of said bobbin and the corresponding side wall of the large-diameter section of said plunger; and wherein the large-diameter section of said plunger is formed with a joint which mechanically links said prism to said plunger.

6. The optical element rotating device as set forth in claim 5, wherein the large-diameter section of said plunger is formed with a laterally extending slot, and said joint includes a stationary pin arranged in said plunger in an axial direction of said plunger so that a top end of said stationary pin exposes to said slot, a movable pin slidably disposed in said plunger in the axial direction of said plunger so that a top end of said movable pin opposes to the top end of said stationary pin within said slot, and a biasing means operably disposed in said plunger for permanently biasing said movable pin towards said stationary pin.

7. The optical element rotating device as set forth in claim 6, wherein each top end of said stationary pin and said movable pin is semi-circular in shape.

8. The optical element rotating device as set forth in claim 7, wherein an outside diameter of the small-diameter section of said plunger is smaller than an inside diameter of said guide hole, a spacer which has an outside diameter equal to or slightly less than the inside diameter of said guide hole, is fitted onto an outer periphery of the small-diameter section, to provide a smooth axial movement of said plunger.

9. The optical element rotating device as set forth in claim 8, wherein the large-diameter section of said plunger is made of a magnetic material.

10. The optical element rotating device as set forth in claim 5, wherein said two coil bobbins are supported on said solenoid casing so that an axial position of each bobbin is adjustable.

11. The optical element rotating device as set forth in claim 10, wherein a biasing means is disposed between the opposing inside faces of said bobbins for permanently biasing said bobbins to move away from each other, and a plunger-stroke adjusting means is attached to said solenoid casing so that a relative position of said adjusting means to said solenoid casing is adjustable in an axial direction of said bobbins while maintaining abutment between an outside end face of said bobbin and an inside end face of said adjusting means by said biasing means.

12. The optical element rotating device as set forth in claim 11, wherein a vibration-isolation member is provided on each of the opposing inside end faces of said bobbins.

13. The optical element rotating device as set forth in claim 4, wherein said plunger being made of a magnetic material and having a pair of plunger support shafts at both ends, said electromagnetic solenoid further comprising:

a coil bobbin winding thereon an exciting coil and having a guide hole slidably receiving therein said plunger;

a stopper fitted into a portion of said guide hold and slidably supporting one of said plunger support shafts;

a solenoid casing supporting thereon said coil bobbin and slidably supporting the other plunger support shaft; and a biasing means permanently biasing said plunger towards the exterior of said guide hole; and wherein said plunger is formed with a joint which mechanically links said prism to said plunger.

14. The optical element rotating device as set forth in claim 13, wherein said plunger is formed with a laterally extending slot, and said joint includes a stationary pin arranged in said plunger in an axial direction of said plunger so that a top end of said stationary pin exposes to said slot, a movable pin slidably disposed in said plunger in the axial direction of said plunger so that a top end of said movable pin opposes the top end of said stationary pin within said slot, and a biasing means operably disposed in said plunger for permanently biasing said movable pin towards said stationary pin.

15. The optical element rotating device as set forth in claim 14, wherein each top end of said stationary pin and said movable pin is semi-circular in shape.

16. The solenoid as set forth in claim 13, wherein the one plunger support shaft consists of a slidable shaft portion and a screw-threaded portion, said slidable shaft portion is slidably supported on said stopper, and a plunger-stroke adjusting nut is threadably received on said screw-threaded portion projected from said stopper to adjust a maximum permissible stroke of said plunger by adjusting a clearance defined between an inside abutment face of said stopper and an inside abutment face of said plunger.

17. The optical element rotating device as set forth in claim 16, wherein a vibration-isolation member is provided on the inside abutment face of said stopper, and another vibration-isolation member is provided on a face of said adjusting nut which face opposes to an outside abutment face of said stopper.

* * * * *